United States Patent [19]
Saito

[11] Patent Number: 5,825,428
[45] Date of Patent: Oct. 20, 1998

[54] APPARATUS AND METHOD FOR REDUCING NOISE WHEN CHANGING THE ASPECT RATIOS OF DISPLAYED DIGITAL VIDEO SIGNALS

[75] Inventor: Hiroaki Saito, Iwai, Japan

[73] Assignee: Victor Company of Japan, Ltd., Yokohama, Japan

[21] Appl. No.: 740,130

[22] Filed: Oct. 24, 1996

[30] Foreign Application Priority Data

Oct. 25, 1995 [JP] Japan ................................. 7-300654

[51] Int. Cl.⁶ ............................................ H04N 7/01
[52] U.S. Cl. ............................................ 348/445; 348/607
[58] Field of Search ................................. 348/445, 556, 348/558, 453, 607, 624

[56] References Cited

U.S. PATENT DOCUMENTS 5,539,470   7/1996   Fukuoka ............................. 348/445

*Primary Examiner*—Victor R. Kostak
*Attorney, Agent, or Firm*—Michael N. Meller

[57] ABSTRACT

An video signal processing apparatus compresses video signals in the horizontal time axis direction and converts the compressed signal into a double-density signal having twice horizontal scanning frequency. Frequency components are removed from an input digital video signal. Here, the frequency components are twice higher than the chrominance subcarrier frequency of an input digital video signal. The digital video signal from which the frequency components are removed is compressed in a horizontal time axis direction. The horizontal scanning frequency of the compressed video signal is then converted into double.

4 Claims, 4 Drawing Sheets

APPARATUS AND METHOD FOR REDUCING NOISE WHEN CHANGING THE ASPECT RATIOS OF DISPLAYED DIGITAL VIDEO SIGNALS

BACKGROUND OF THE INVENTION

The present invention relates to a video signal processing apparatus and method for executing both video signal compression processing for compressing video signals in the horizontal time axis direction and double-speed conversion processing for obtaining double-density signals having twice horizontal scanning frequency.

Recently, a TV set having a picture screen of wide aspect ratio (horizontal and vertical ratio: 16:9) has been put on the market. Here, a horizontal time axis direction compressing circuit is required for this TV set in order to reproduce a picture having a standard aspect ratio (i.e., 4:3) of the current video signals (NTSC signals) on the picture screen of the wide aspect ratio of 16:9.

On the other hand, in the digital signal processing system of the NTSC video signals, noise having a frequency of 2 fsc (fsc: chrominance subcarrier signal frequency=3.58 MHz) is inevitably generated. This noise is generated, particularly, during A/D conversion or during three-dimensional Y/C separation processing, due to a problem related to a system within an IC circuit (e.g., A/D converter IC, three-dimensional Y/C separator IC, etc.).

Here, even in the case of the digital video signals upon which the noise components of 2 fsc are superposed, when the video signals are simply compressed in the horizontal time axis direction and then D/A converted before output to the picture display section (e.g., CRT), the reproduced picture is not subjected to harmful influence of the 2 fsc noise components. This is because the noise components of 2 fsc exist in a region sufficiently higher than the effective video signal band (4.5 MHz) of the NTSC video signals. In other words, there arises no specific problem even when no countermeasure is taken against the 2 fsc noise components.

In the recent TV set having a wide aspect ratio (horizontal and vertical ratio: 16:9), a TV set (referred to as double-speed wide TV set) operative at a horizontal scanning frequency about twice higher than that of the NTSC signals has been developed. This TV set can reproduce high grade TV signals, such as high-vision signals or video signals output by a computer. That is, in order to reproduce the NTSC video signals by the double-speed wide TV set, a double-speed converting circuit for converting the horizontal scanning frequency of the NTSC signals (i.e., for obtaining double-density signals) into double is required. Here, as the double-speed converting circuit, there is a circuit for writing data in a memory per horizontal synchronization period and then reading the written data from the memory at a speed twice higher than the clock signals, for instance.

In the double-speed wide TV set, when the NTSC signals are reproduced while keeping the aspect ratio of 4:3, the horizontal time axis direction compressing circuit is necessary, as already explained.

FIG. 1 shows a conventional video signal processing apparatus provided with a horizontal time axis direction compression circuit and a double-speed converting circuit.

In FIG. 1, an analog signal (the NTSC signal) is input to an A/D converter 1, and converted into digital signals at a sampling rate of 8 fsc. In response to the converted digital signals, a digital picture processing circuit 2 executes various processing such as three-dimensional Y/C separation, luminance noise reduction, etc. The output signals of the digital picture processing circuit 2 are supplied to a horizontal time axis direction compressing circuit 3 to execute compression processing of the input signals in the horizontal direction at a predetermined compression ratio. The input signals are processed at a compression ratio of 4/3 in order to obtain a reproduced picture with keeping the aspect ratio of 4:3. Here, the sampling rate is 8 fsc for both the digital picture processing circuit 2 and the horizontal time axis direction compression circuit 3.

In a rate converting circuit 4 at the succeeding stage, the sampling rate of 8 fsc is converted into 4 fsc; in other words, every second data is taken away. The output signals of the rate converting circuit 4 is supplied to a line double-speed converting circuit 5 to convert the signals into double-density signals. That is, the line double-speed converting circuit 5 reads the data from a memory in the rate converting circuit 4 twice per horizontal synchronization period at a speed twice higher than clock signals, to convert the 4 fsc-rate signals into 8 fsc-rate double-density signals. In this case, the double density signals are such that data contents for one line are arranged twice repeatedly.

The rate converting circuit 4 and the line double-speed converting circuit 5 constitute a double-speed converting circuit 8.

The digital video signals converted into the double density signals are converted into an analog signal by a D/A converter 6, and then output to a monitor, such as CRT.

The conventional video signal processing apparatus as described above has a disadvantage as follows:

When the video signals are displayed on the CRT after having been processed by the horizontal time axis direction compressing circuit 3 and the double-speed converting circuit 8, fine but recognizable vertical line noises appear on the displayed picture and thereby the picture quality deteriorates.

SUMMARY OF THE INVENTION

With these problems in mind, therefore, it is the object of the present invention to provide a video signal processing apparatus and method which can prevent vertical line noises from being generated on the reproduced picture for improvement of picture quality, even in the case where digital video signals have been processed for both the horizontal time axis direction compression and the double-speed conversion processing.

To achieve the above-mentioned object, the present invention provides an apparatus for processing a video signal comprising: removing means for removing frequency components from an input digital video signal, the frequency components being twice higher than a chrominance subcarrier frequency of the input digital video signal; compressing means for compressing the digital video signal from which the frequency components are removed, in a horizontal time axis direction; and converting means for converting a horizontal scanning frequency of the compressed video signal into double.

The removing means may include a trap that attenuates the frequency components twice higher than the chrominance subcarrier frequency of the input digital video signal.

The converting means may include: a rate converter that converts a sampling rate of the compressed video signal into a half; and a line double-speed converter that converts the video signal in which the sampling rate is converted, into a double-density signal having twice horizontal scanning frequency.

The present invention further provides a method of processing a video signal comprising the steps of: removing frequency components from an input digital video signal, the frequency components being twice higher than a chrominance subcarrier frequency of the input digital video signal; compressing the digital video signals from which the frequency components are removed, in a horizontal time axis direction; and converting a horizontal scanning frequency of the compressed video signal into double.

DETAILED DESCRIPTION OF THE PREFERRED EMBODIMENTS

Before describing a preferred embodiment according to the invention, it will be explained how the inventor has found the causes of generation of the vertical line noises in the reproduced picture and the way to prevent the generation of the noises.

After having researched the causes of generation of the vertical line noises in the reproduced picture, the inventor has found the following facts:

The video signals are not subjected to the harmful influence by only the horizontal time axis direction compression processing. However, when the video signals are processed for both the horizontal time axis direction compression and the double-speed conversion, the video signal band changes, the 2 fsc noise components are thus shifted to the vicinity of the effective video signal band. The vertical fine line noises are therefore generated due to the shifted noise components at regular intervals on the displayed picture.

This will be described in further detail with reference to FIGS. 1 and 2. FIG. 2 is an illustration showing the frequency spectrum at each of points A to D shown in FIG. 1.

Figure 1:
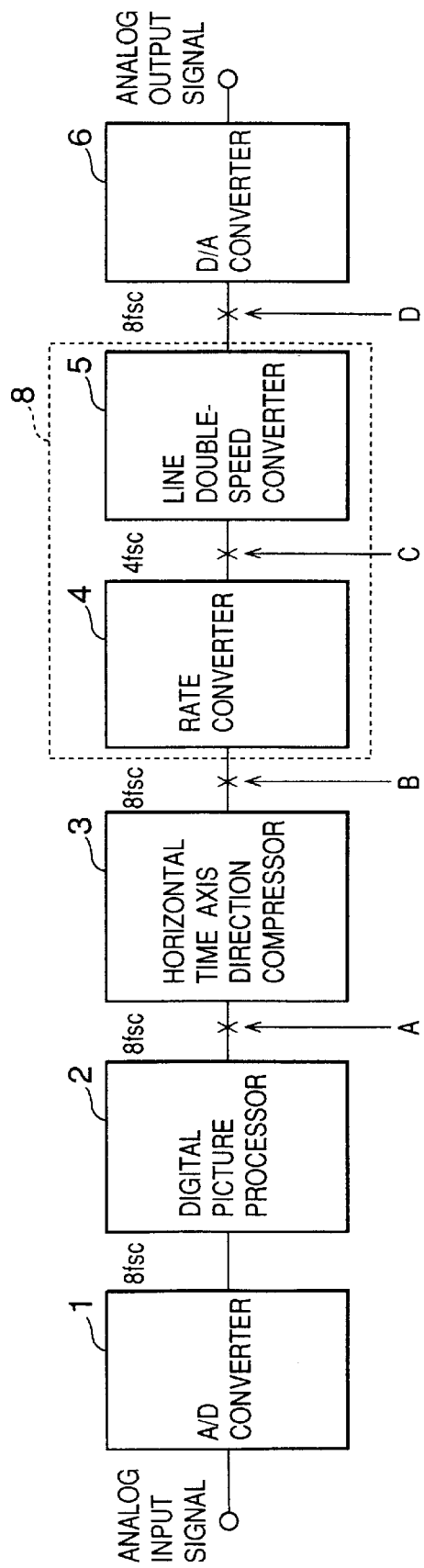
FIG. 1 is a block diagram showing a conventional video signal processing apparatus.
Figure 2:
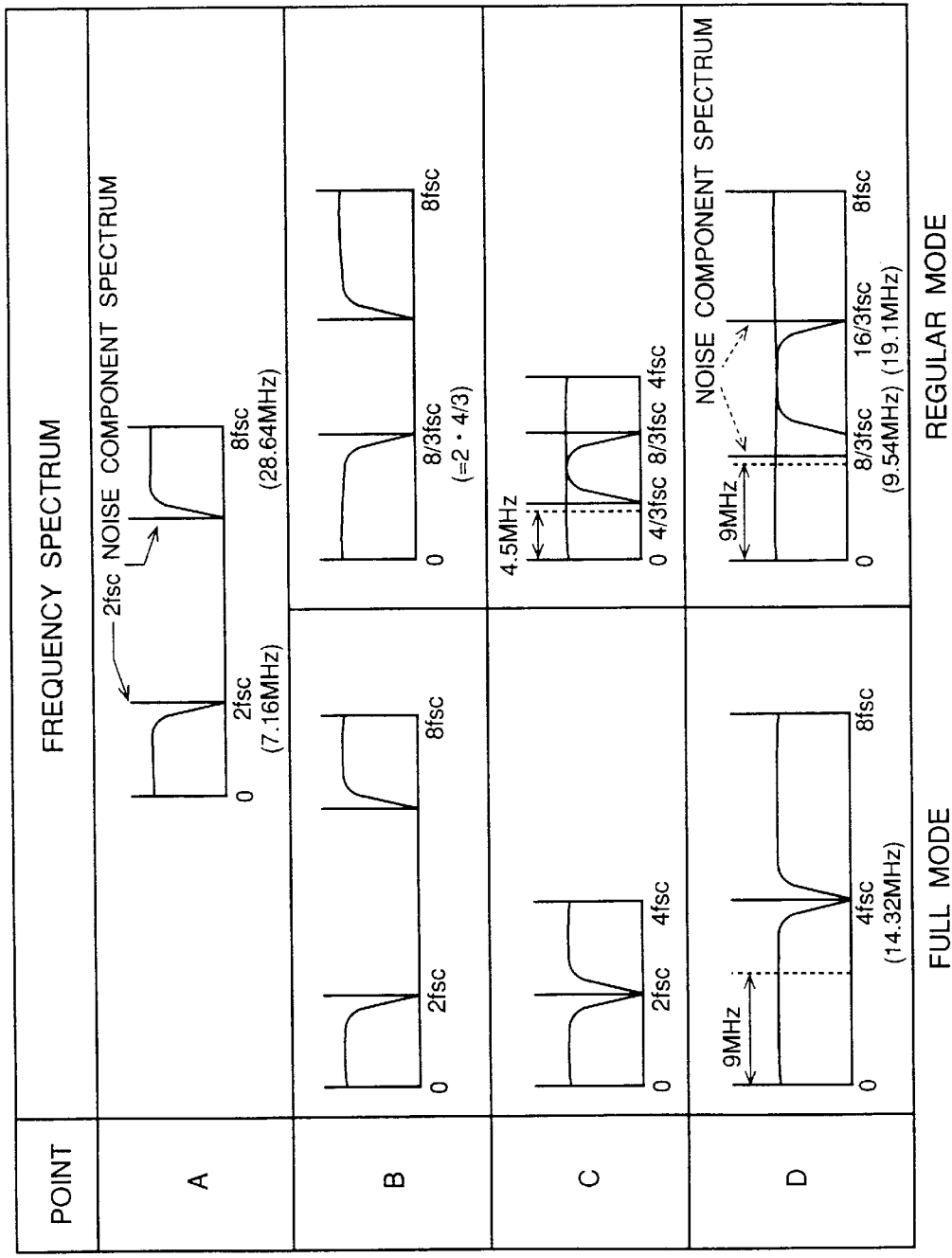
FIG. 2 is an illustration showing a frequency spectrum at each point in the conventional processing apparatus shown in FIG. 1.

At the point A shown in FIG. 1, it is confirmed that noises having 2 fsc frequency components are superposed upon the digital video signals as shown in FIG. 2. Here, as the cause why the noises are superposed upon the video signals, it can be considered a problem related to the system within the IC circuits of the video signal processing apparatus, such as the A/D converter 1 and the digital picture processing circuit 2 (e.g., three-dimensional Y/C separating IC, etc.).

The frequency band of the digital video signals upon which the 2 fsc noise components are superposed is widened when compressed by the horizontal direction by the horizontal time axis direction compression circuit 3. As a result, at the point B in FIG. 1, the 2 fsc noise components vary according to the compression ratio as shown in FIG. 2.

Here, FIG. 2 lists the two cases of full mode and regular mode. In the full mode (no compression), the reproduced picture is widened in the horizontal direction when the NTSC signals are reproduced on a (16:9) picture screen. On the other hand, in the regular mode (4/3 compression in the horizontal time axis direction), the aspect ratio of the reproduced picture is kept at 4:3 when the NTSC signals are reproduced. That is, since the signals are not compressed in the full mode, the 2 fsc noise components will not change. In the regular mode, however, since the signals are compressed at a compression ratio of 4/3, the noise components are shifted to 8/3 fsc at the point B in FIG. 2.

In the rate converting circuit 4 at the succeeding stage, the band width of the video signals is narrowed as shown in FIG. 2 at the point C in FIG. 1 because the sampling rate of 8 fsc is converted to 4 fsc. At the point C as shown in FIG. 2, no folding is produced in the full mode. On the contrary, a folding is produced in the regular mode at the point C as shown in FIG. 2. This folding causes generation of noise components of 4/3 fsc frequency in addition to the noise components of 8/3 fsc. Here, the effective video signal band is 4.5 MHz and the noise components of 4/3 fsc (=4.77 MHz) are very close to the band of 4.5 MHz.

Next, the line double-speed converting circuit 5 converts the 4 fsc rate signals into 8 fsc rate signals. Therefore, at the point D shown in FIG. 1 in the full mode, the noise components of 2 fsc at the point C are shifted to 4 fsc as shown in FIG. 2. In the regular mode, on the other hand, the noise components of 4/3 fsc and 8/3 fsc at the point C are shifted to 8/3 fsc and 16/3 fsc, respectively, as shown in FIG. 2. Therefore, the effective video signal band is doubled to 9 MHz by the line double-speed conversion.

Here, at the point D, the noise components of 4 fsc are 14.32 MHz in the full mode and those of 16/3 fsc are 19.1 MHz in the regular mode. These noise components are thus sufficiently high frequencies as compared with the effective video signal band of 9 MHz.

These noise components of 4 fsc and 16/3 fsc are easily removed or reduced by a high frequency noise removing LPF (low-pass filter) or folding removing LPF that executes digital operations provided at the rear stage of the line double-speed converting circuit 5.

In contrast with this, at the point D, the noise components of 8/3 fsc are as low as 9.5 MHz in the regular mode, and this noise frequency is in the close vicinity of the effective video signal band 9 MHz. It is thus impossible to remove the noise components of 8/3 fsc (in the regular mode) by use of the LPF. As a result, the remaining noise components of 8/3 fsc cause the vertical line noises on the CRT, so that picture quality deteriorates.

Here, it may be considered to remove the 8/3 fsc noise components (9.5 MHz) compulsorily by connecting a 8/3 fsc trap circuit at the rear stage of the line double-speed converting circuit 5. This method, however, is not appropriate because the signal components in the effective video signal band (=9 MHz) are also attenuated. It may further be considered to use a LPF of a low cut-off frequency at the rear stage of the line double-speed converting circuit 5.

However, it has been found that the noise components that cause the vertical noises on the CRT depend on a compression ratio at the stage of the horizontal time axis direction compression. Thus, the trap circuit of a fixed attenuation frequency, such as, 8/3 fsc and LPF of a fixed cut-off frequency described above cannot meet a demand for a video signal processing apparatus provided with a plurality of compression ratios of not only 4/3.

In this case, it may further be considered to provide a trap circuit that can attenuate a plurality of frequency components by switching a attenuation band. However, this results in a complex circuit architecture. Further, a picture quality will deteriorate too much by frequency attenuation by such a trap circuit.

These researches have reached the following conclusion:

A 2 fsc-trap circuit is connected at the front stage of the horizontal time axis direction compressing circuit 3, in order to remove only the remaining fundamental noise components of 2 fsc.

Figure 3:
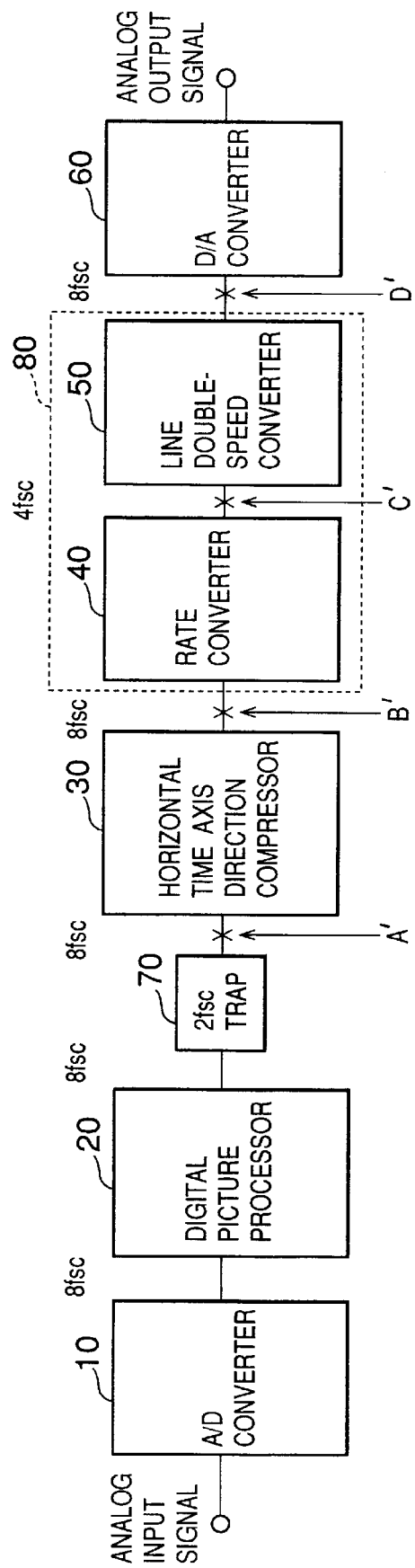
FIG. 3 is a block diagram showing an embodiment of the video signal processing apparatus according to the present invention.
Figure 4:
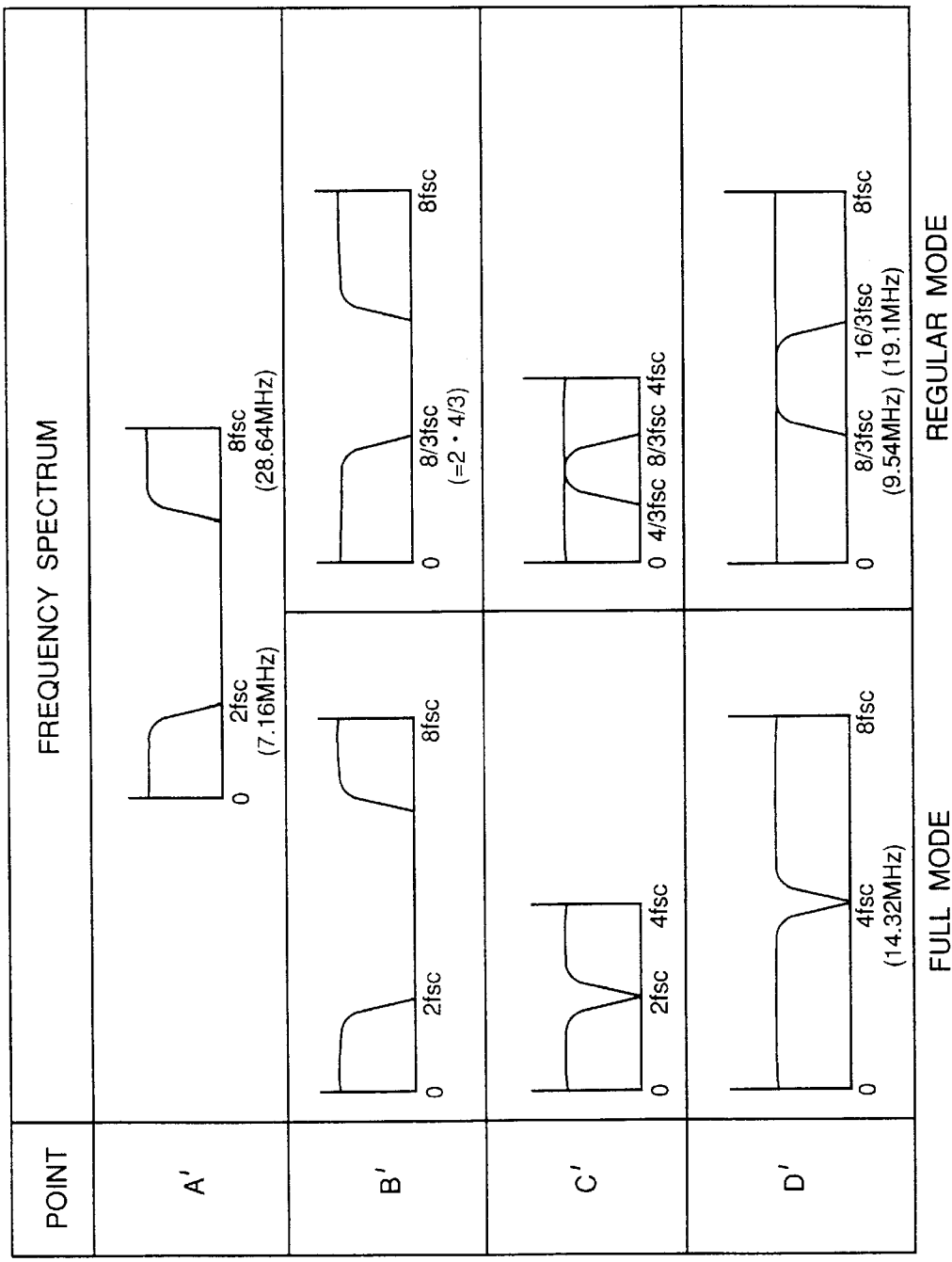
FIG. 4 is an illustration showing a frequency spectrum at each point in the processing apparatus shown in FIG. 3.

Now, a preferred embodiment of the video signal processing apparatus according to the present invention will be described hereinbelow with reference to FIGS. 3 and 4. FIG. 4 is an illustration showing the frequency spectrum at each of points A' to D' shown in FIG. 3.

An input analog signal (NTSC signal) is input to an A/D converter 10, and then converted into digital signals at a sampling rate of 8 fsc. A digital picture processing circuit 20 executes various processing such as three-dimensional Y/C separation, luminance noise reduction, etc., to the converted digital signals.

Here, noise components of 2 fsc are superposed upon the video signals output by the digital picture processing circuit 20, for the reasons as already explained. The noise components of 2 fsc are thus removed by a 2 fsc-trap circuit 70 for removing 2 fsc signals according to the present invention.

As understood by a spectrum at the point A' shown in FIG. 4, the noise components of 2 fsc are removed by the 2 fsc trap circuit 70. Here, the frequency of 2 fsc (=7.16 MHz) is sufficiently higher than the effective video signal band of 4.5 MHz. The 2 fsc trap circuit 70 will thus not exert any harmful influence upon the video signals.

The output signals of the 2 fsc trap circuit 70 are supplied to a horizontal time axis direction compressing circuit 30 to execute compression processing of the input signals in the horizontal direction at a predetermined compression ratio. The input signals are processed at a compression ratio of 4/3 in order to obtain a reproduced picture with keeping the aspect ratio of 4:3. Here, the sampling rate is 8 fsc for both the digital picture processing circuit 20 and the horizontal time axis direction compression circuit 30.

A rate converting circuit 40 then converts the sampling rate of 8 fsc into 4 fsc. Every second data is thus taken away at this stage. The output signals of the rate converting circuit 40 is supplied to a line double-speed converting circuit 50 that converts the signals into double-density signals. More in detail, the line double-speed converting circuit 50 reads the data from a memory in the rate converting circuit 40 twice per horizontal synchronization period at a speed twice higher than clock signals, to convert the 4 fsc-rate signals into 8 fsc-rate double-density signals. In this case, the double density signals are such that data contents for one line are arranged twice repeatedly.

The rate converting circuit 40 and the line double-speed converting circuit 50 constitute a double-speed converting circuit 80.

The digital video signals converted into the double density signals are then converted into an analog signal by a D/A converter 60, and then output to a CRT not shown.

In the video signal processing apparatus according to the present invention, the 2 fsc trap circuit 70 is disposed at the front stage of the horizontal time axis direction compressing circuit 30. As shown in FIG. 4, the noise components of 2 fsc are removed at the point A' shown in FIG. 3. Therefore, also as shown in FIG. 4, no noise component appear at the points B' to D' shown in FIG. 3.

FIG. 4 shows the case where 4/3 compression is executed by the horizontal time axis direction compressing circuit 30. Not only that, however, such vertical line noises can be prevented on the reproduced picture at any compression ratio.

Further, the above-mentioned embodiment discloses the case where the analog signals are A/D converted at the sampling rate of 8 fsc. However, the same effect can be obtained when sampled at the sampling rate of 4 fsc.

Further, in the above-mentioned embodiment, the chrominance subcarrier signal frequency is 3.56 MHz because the input video signals are NTSC signals. However, the chrominance subcarrier signal frequency can be changed according to a type of the input video signals, such as PAL signals.

As described above, in the video signal processing apparatus according to the present invention, even if the digital wide signals are processed for the horizontal time axis direction compression and the double-speed conversion, it is possible to remove the vertical line noises caused by the 2 fsc noise components and displayed on the reproduced picture, so that the picture quality can be improved. This is because the 2 fsc trap circuit for removing the frequency components (2 fsc) twice higher than the chrominance subcarrier frequency (fsc) is disposed at the front stage of the horizontal time axis direction compressing circuit.

What is claimed is:

1. In an apparatus for reducing noise generated in a digital video signal processing system when converting a first video signal to be displayed with a first aspect ratio and having a first horizontal scanning frequency into a second video signal to be displayed with a second aspect ratio wider than said first and having a second horizontal scanning frequency faster than said first, the improvement comprising:

removing means for removing frequency components from an input digital video signal having a chrominance subcarrier frequency, the frequency components being twice the frequency of said chrominance subcarrier frequency of the input digital video signal;

compressing means for compressing the digital video signal from which the frequency components are removed, in a horizontal time axis direction; and converting means for doubling the horizontal scanning frequency of the compressed video signal.

2. The apparatus according to claim 1, wherein the removing means includes a trap that attenuates the frequency components having a frequency twice the chrominance subcarrier frequency of the input digital video signal.

3. The apparatus according to claim 1, wherein the converting means includes:

a rate converter that reduces a sampling rate of the compressed video signal by one-half; and a line double-speed converter that converts the video signal in which the sampling rate is reduced, into a double-density signal having twice the horizontal scanning frequency of said first video signal.

4. A method for reducing noise generated in a digital video signal processing system when converting a first video signal to be displayed with a first aspect ratio and having a first horizontal scanning frequency into a second video signal to be displayed with a second aspect ratio wider than said first and having a second horizontal scanning frequency faster than said first, the improvement comprising the steps of:

removing frequency components from an input digital video signal having a chrominance subcarrier frequency, the frequency components being twice the frequency of said chrominance subcarrier frequency of the input digital video signal;

compressing the digital video signals from which the frequency components are removed, in a horizontal time axis direction; and doubling the horizontal scanning frequency of the compressed video signal.

\* \* \* \* \*